United States Patent
Sawyer et al.

(10) Patent No.: US 7,118,697 B2
(45) Date of Patent: Oct. 10, 2006

(54) METHOD OF MOLDING COMPOSITE OBJECTS

(75) Inventors: Michael Sawyer, Madison, TN (US); Gary Gustine, Bonham, TX (US)

(73) Assignee: ADC DSL Systems Inc., Eden Prairie, MN (US)

( * ) Notice: Subject to any disclaimer, the term of this patent is extended or adjusted under 35 U.S.C. 154(b) by 307 days.

(21) Appl. No.: 10/189,369

(22) Filed: Jul. 2, 2002

(65) Prior Publication Data

US 2004/0004306 A1    Jan. 8, 2004

(51) Int. Cl.
*B29C 45/14* (2006.01)

(52) U.S. Cl. ............... 264/135; 264/247; 264/265; 264/274; 264/275; 156/245

(58) Field of Classification Search ............... 264/279, 264/265, 273, 274, 275, 134, 247; 156/245
See application file for complete search history.

(56) References Cited

U.S. PATENT DOCUMENTS 4,722,821 A * 2/1988 Vermilye ............... 264/273
5,075,066 A * 12/1991 Terada et al. ............... 264/247
5,118,458 A * 6/1992 Nishihara et al. ............ 264/155
6,019,928 A * 2/2000 Fujitani et al. ............. 264/263
6,579,485 B1 * 6/2003 Smith et al. ................. 264/247

* cited by examiner

*Primary Examiner*—Edmund H. Lee
(74) *Attorney, Agent, or Firm*—Fogg and Associates; David N. Fogg (57) ABSTRACT

Methods for molding a surround over a liner to form a composite shell are provided. The liner is placed in a mold and molten surround material is injected into the mold so as to surround the liner. A surface of a protrusion of the liner abuts the mold so that the surface is exposed and is substantially flush with an exterior surface of the surround after the composite shell is removed from the mold. Molten surround material flows into a slot in a perimeter of the protrusion so that when the surround material solidifies, a rib of surround material extends into the slot to form a pressure seal between the liner and the surround. An adhesive is applied to the liner before placing the liner in the mold for reducing relative movement between the liner and surround as the surround material solidifies and the liner and surround cool.

39 Claims, 5 Drawing Sheets

METHOD OF MOLDING COMPOSITE OBJECTS

CROSS RELATED APPLICATION

This application is related to application Ser. No. 10/155,050 (U.S. Pat. No. 6,862,180), filed on May 24, 2002, and entitled "HOUSINGS FOR CIRCUIT CARDS" (the '180 Patent). The '180 Patent is incorporated herein by reference.

TECHNICAL FIELD

The present invention relates generally to the field of molding and, in particular, to molding composite objects.

BACKGROUND

Composite objects are often manufactured by molding an exterior component, such as a plastic or the like, over an interior component, such as a metal or the like, using an over-molding process. In some applications, composite objects have a composite exterior surface that includes portions of the interior and exterior components, e.g., a tool having a plastic handle molded over a portion of a metal body.

One application where it is advantageous to have a composite exterior surface that includes portions of the interior and exterior components involves a housing for containing electronic components, e.g., circuit cards, such as described in the '180 Patent. The housing includes a composite shell having a substantially non-heat conducting surround molded over a heat conducting liner. The liner extends through the surround so that an exterior surface of the composite shell is a composite surface that includes an exposed portion of the liner and the surround. A heat sink is disposed on the exterior surface of the composite shell and is thermally coupled to the exposed portion of the liner. The electronic components are thermally coupled to an interior of the liner. Heat is transferred from the electronic components to the liner. The heat flows through the liner to the heat sink and is transferred to an environment surrounding the housing.

In some applications there is a pressure differential between an interior and exterior the composite shell that causes air, for example, to leak between the surround and the liner where the liner extends through the surround. This is because it is difficult to mold one component over another component so that there is a pressure seal between the two components.

For the reasons stated above, and for other reasons stated below that will become apparent to those skilled in the art upon reading and understanding the present specification, there is a need in the art for molding one component over another component so that there is a pressure seal between the two components.

SUMMARY

The above-mentioned problems with molding one component over another and other problems are addressed by embodiments of the present invention and will be understood by reading and studying the following specification.

One embodiment provides a method for molding a composite object. The method includes applying an adhesive to a first object of a first material, curing the adhesive, and heating the first object. Placing the first object in a mold so that a surface of a protrusion of the first object abuts an interior surface of the mold to prevent the surface of the protrusion from being covered by a second material to be injected into the mold in a molten state is also included in the method. The method includes injecting the second material in the molten state into the mold so that the second material surrounds the first object to form the composite object. The second material flows into a slot in a perimeter of the protrusion of the first object so that when the second material solidifies, a rib of the second material extends into the slot in the perimeter to form a pressure seal between the first object and the second material. Removing the composite object from the mold is also included in the method. The protrusion of the first object extends through the second material so that the surface of the protrusion is substantially flush with an exterior surface of the second material. The method includes stabilizing the composite object until dimensions of the composite object stop changing.

Another embodiment provides a method for molding a composite shell. The method includes applying an adhesive to surfaces of a metal liner to be covered by a surround of the composite shell, heating the metal liner, and placing the metal liner in a mold so that a surface of a protrusion of the metal liner abuts an interior surface of the mold so that the surface of the protrusion remains uncovered by the surround. Injecting a plastic in a molten state into the mold so that the plastic surrounds the metal liner to form the surround and thereby the composite shell is also included in the method. The plastic flows into a plurality of channels disposed in an exterior surface of the metal liner to reduce slippage and de-lamination between the metal liner and the surround when the plastic solidifies. In addition, the plastic flows into a plurality of slots in a perimeter of the protrusion so that when the plastic solidifies, a plurality plastic ribs extends into the plurality of slots in the perimeter to form a pressure seal between the metal liner and the surround. The method also includes removing the composite shell from the mold. The protrusion of the liner extends through the surround so that the surface of the protrusion is substantially flush with an exterior surface of the surround. Stabilizing the composite shell until dimensions of the composite shell stop changing is also included in the method.

Other embodiments are described and claimed.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods for molding composite objects by molding one component over another component so that a pressure seal is created between the two components. In one embodiment, a surround is molded over a liner to form a composite shell. The liner is placed in a mold and molten surround material is injected into the mold so as to surround the liner. A surface of a protrusion of the liner abuts the mold so that the surface is exposed and is substantially flush with an exterior surface of the surround after the composite shell is removed from the mold. Molten surround material flows into a slot in a perimeter of the protrusion so that when the surround material solidifies, a rib of surround material extends into the slot to form a pressure seal between the liner and the surround. An adhesive is applied to the liner before placing the liner in the mold for reducing relative movement between the liner and surround as the surround material solidifies and the liner and surround cool, thereby helping to maintain pressure-sealing contact between the perimeter and the surround. In another embodiment, the molten surround material flows into a plurality of channels disposed in an exterior surface of the liner to reduce slippage and de-lamination between the metal liner and the surround when the surround material solidifies, further helping to maintain pressure-sealing contact between the perimeter and the surround.

Figure 1:
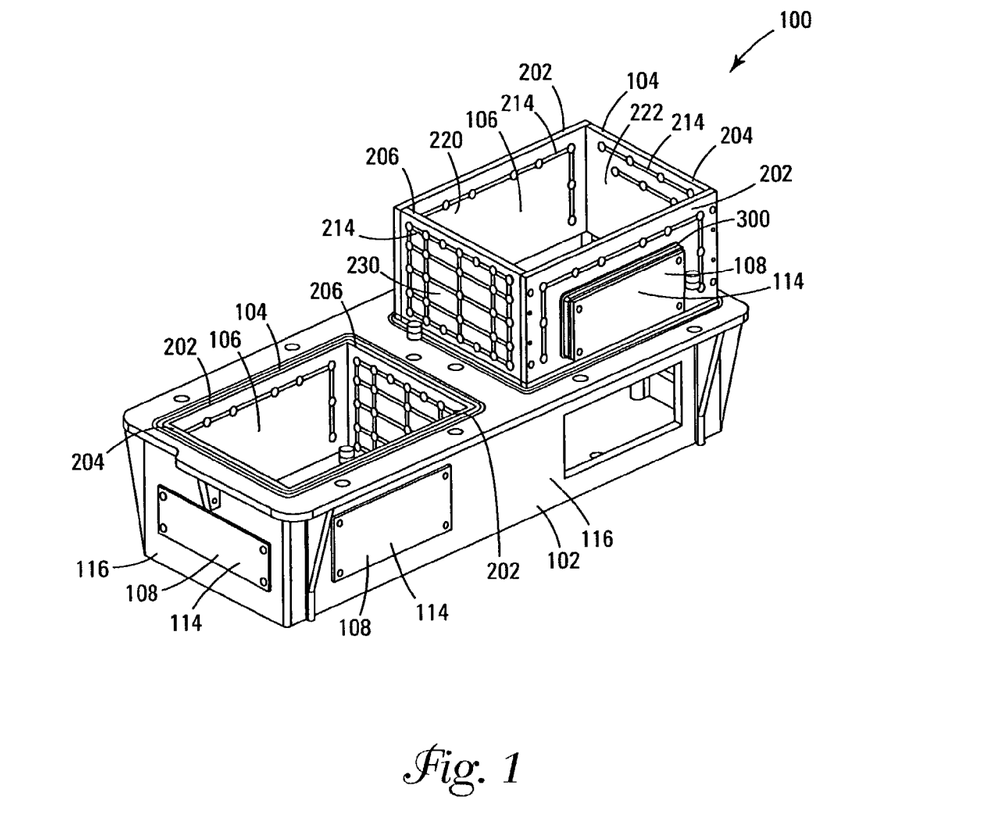
FIG. 1 is an isometric view of a composite shell according to an embodiment of the present invention.

FIG. 1 is an isometric view of a composite shell 100 according to an embodiment of the present invention. Shell 100 includes a substantially non-heat conducting surround 102 surrounding a pair of heat conducting liners 104. An interior 106 of each of liners 104 defines each of a pair of compartments within shell 100. In one embodiment, surround 102 is plastic, such as glass-filled nylon or the like, and liners 104 are metal, such as aluminum or the like. Each of liners 104 include protrusions 108 that extend through surround 102 so that a surface 114 of each protrusion 108 is substantially flush with an external surface 116 of surround 102. In one embodiment, a case (not shown) adapted to contain a plurality of circuit cards, such as repeater cards or the like of a telecommunications system, is contained within interior 106 of each of liners 104 and, in another embodiment, is also thermally coupled to the respective liner 104, e.g., as described in the '180 Patent.

Figure 2:
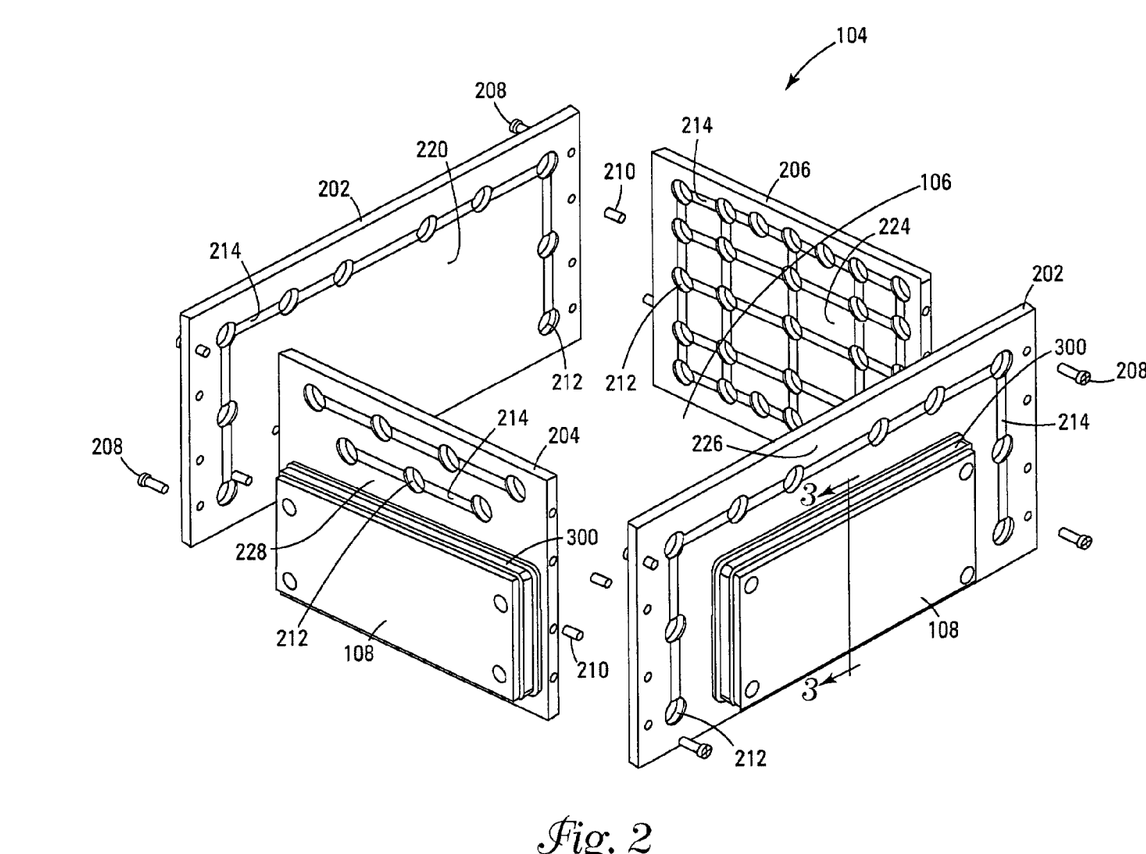
FIG. 2 is an exploded isometric view of a liner of the composite shell of FIG. 1.

FIG. 2 illustrates one embodiment of liner 104. Liner 104 has opposing sidewalls 202 each having one of protrusions 108, an end wall 204 having one of protrusions 108, and an end wall 206. In one embodiment, sidewalls 202 and end walls 204 and 206 are die-cast, machined, or the like and are secured together using fasteners 208, such as cap screws, and/dowels 210. In another embodiment, each of sidewalls 202 and end walls 204 and 206 includes a number of apertures 212 passing therethrough. In some embodiments, apertures 212 are interconnected by channels 214 disposed on interior surfaces 220, 222, and 224 respectively of sidewalls 202 and end walls 204 and 206 and exterior surfaces 226, 228, and 230 respectively of sidewalls 202 and end walls 204 and 206, as shown in FIGS. 1 and 2.

Figure 3:
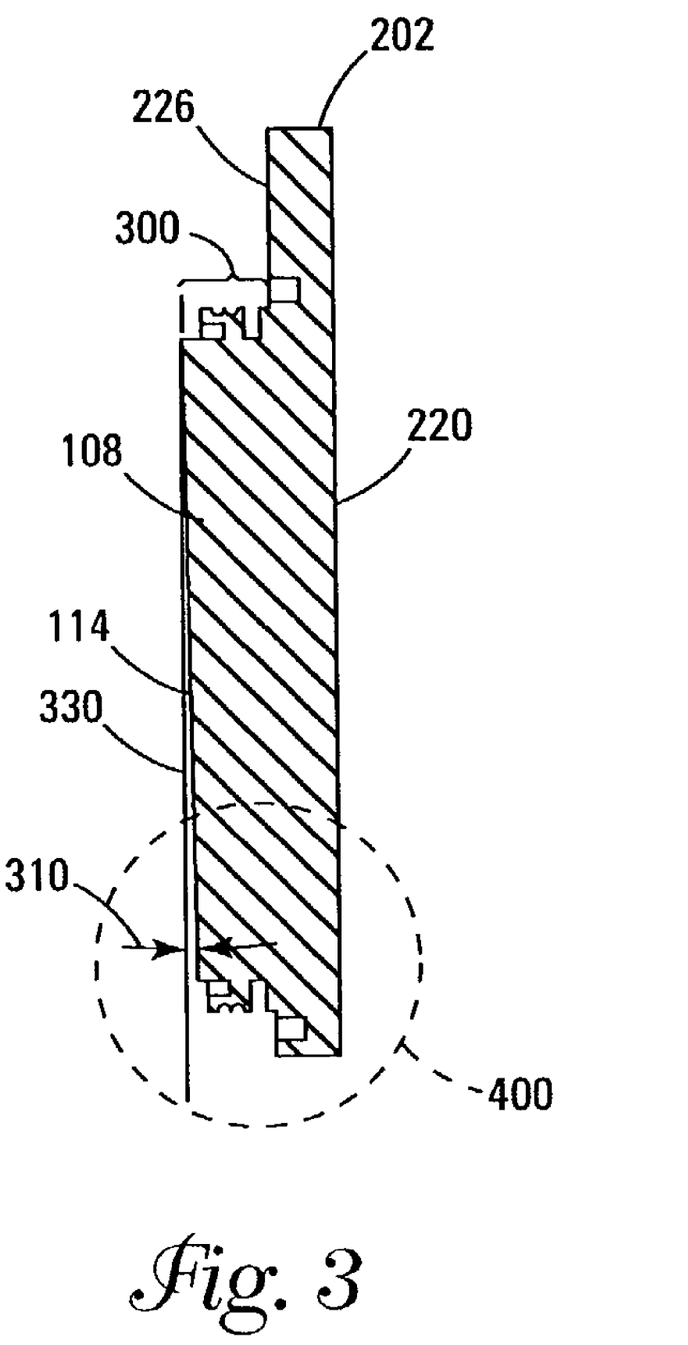
FIG. 3 is a view taken along line 3—3 of FIG. 2.
Figure 4:
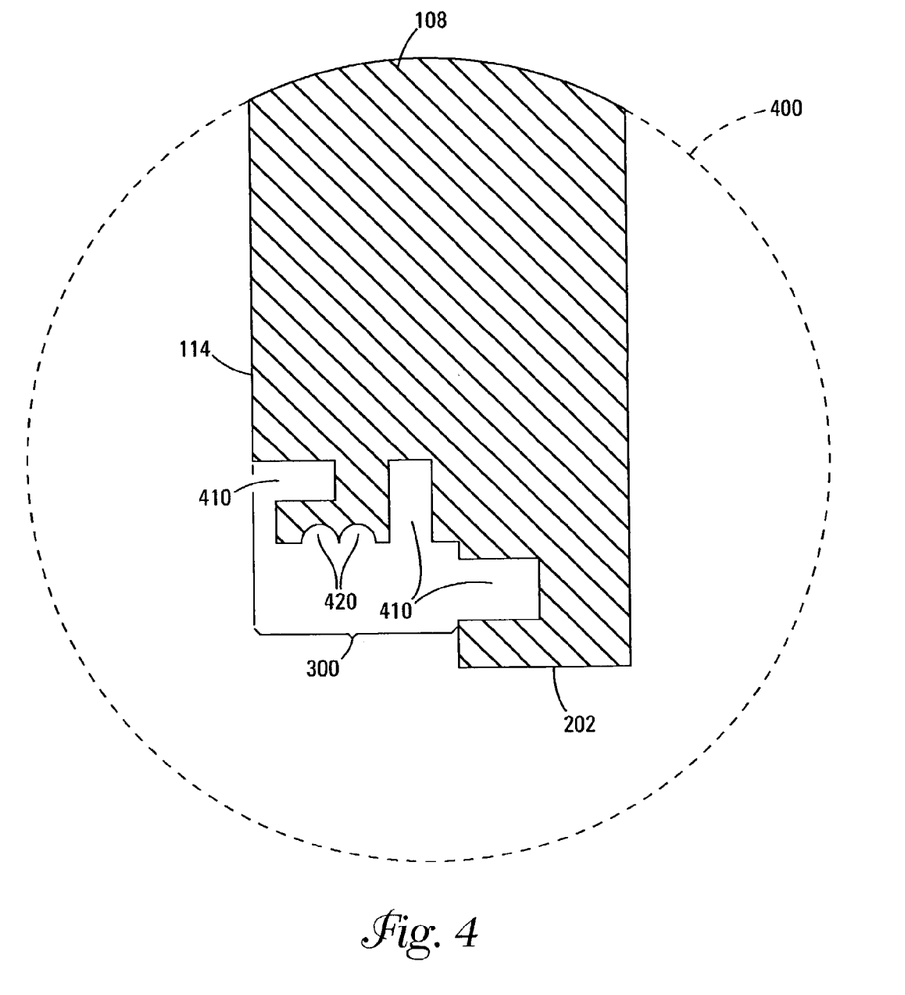
FIG. 4 is an enlarged view of region 400 of FIG. 3.

FIG. 3 is a view taken along line 3—3 of FIG. 2 illustrating protrusion 108. In one embodiment, surface 114 of protrusion 108 makes an angle 310 relative to the interior and exterior surfaces of the respective sidewall 202 or end wall 204, e.g., as shown for interior surface 220 and exterior surface 226 of sidewall 202 in FIG. 3. For illustrative purposes, angle 310 is shown in FIG. 3 between surface 114 and a line 330, drawn parallel to interior surface 220 and exterior surface 226 of sidewall 202. In another embodiment, angle 310 is one degree. In other embodiments, angle 310 is within the range of 2 to 20 degrees. As seen in FIGS. 1–3, a perimeter 300 surrounds protrusion 108. FIG. 4 is an enlarged view of a region 400 of FIG. 3 illustrating perimeter 300. In one embodiment, perimeter 300 includes slots 410, e.g., of rectangular (as shown), semi-circular, square, dovetail, or other suitable cross-section, and slots 420, e.g., of rectangular, semi-circular (as shown), square, dovetail, or other suitable cross-section.

Composite shell 100 is manufactured using an over-molding process involving molding surround 102 over liners 104. Positioning liners 104 in a mold and injecting molten surround material, e.g., glass-filled nylon, into the mold accomplish this. Surface 114 of each protrusion 108 abuts an interior surface of the mold during molding to prevent surface 114 from being covered by shell material during molding so that surface 114 is substantially flush with surface 116 of surround 102 after molding. During molding, molten surround material flows into slots 410 and 420 of perimeter 300 of protrusions 108 substantially filling them. When the surround material solidifies, ribs of surround material of rectangular and semi-circular cross-section respectively extend into slots 410 and 420 of perimeter 300 to bond perimeter 300 to surround 102. This forms a pressure seal between perimeter 300 and surround 102. In some embodiments, the pressure seal also seals against weather, e.g., moisture, salt fog, or the like. In one embodiment, the pressure seal seals composite shell 100 against a pressure differential of about 15 psi.

Figure 5:
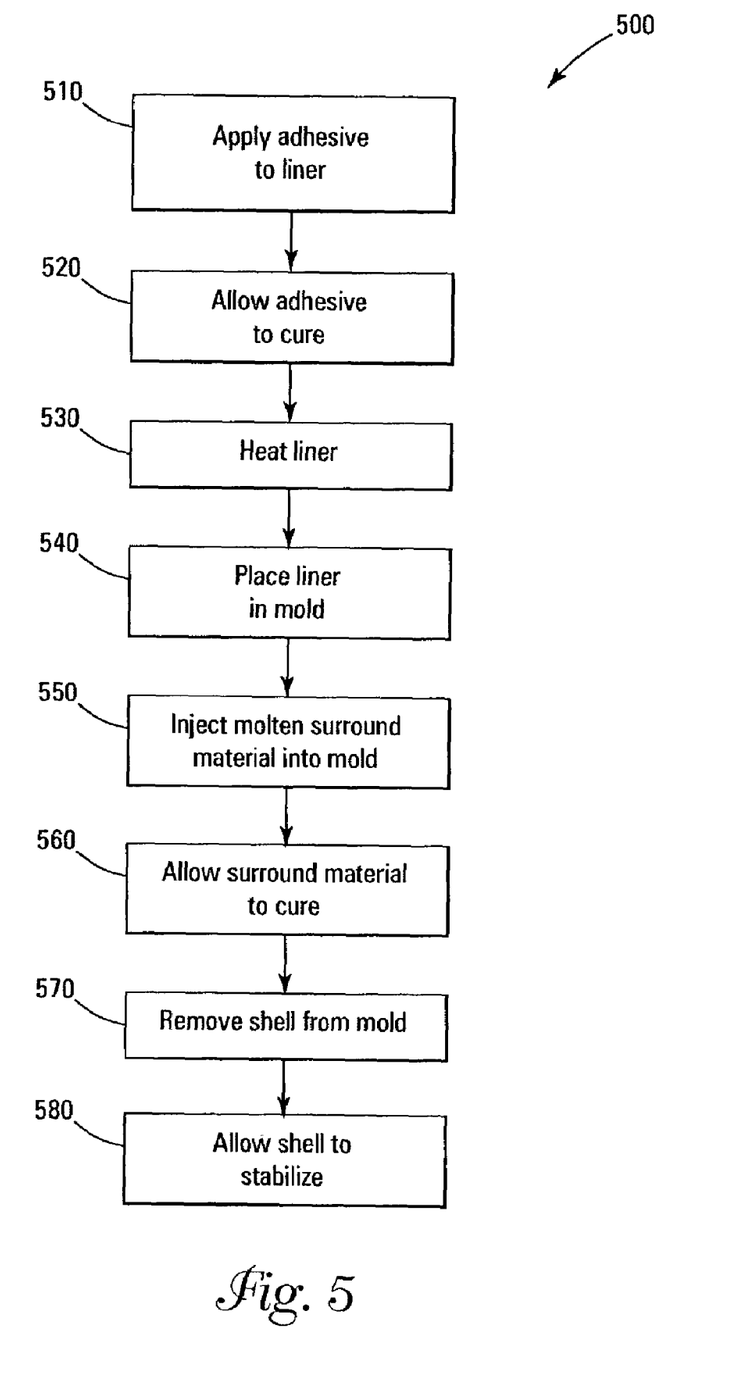
FIG. 5 is a flowchart of a molding method according to an embodiment of the present invention.

FIG. 5 is a flow chart of a method 500 for molding composite shell 100 according to an embodiment of the present invention. At block 510 of method 500 an adhesive is applied to surfaces of liners 104 to be covered by surround material, e.g., exterior surfaces 226, 228, and 230 respectively of sidewalls 202 and end walls 204 and 206, by spraying, brushing, dipping, or the like. This includes applying the adhesive to perimeter 300 of protrusions 108 and to bounding surfaces of channels 214 and apertures 212. In one embodiment, the adhesive is specially manufactured for molding processes, e.g., available as part number ADH 4693 SG from 3M Corporation, St. Paul, Minn. The adhesive reduces relative movement (or slippage) between liners 104 and surround 102 as the surround material solidifies and liners 104 and surround 102 cool, thus helping to maintain pressure-sealing contact between perimeter 300 and surround 102. The adhesive is allowed to cure until tacky at block 520, e.g., from about 6 hours to about 48 hours in one embodiment.

Liners 104 are heated by radiation, e.g., using heat lamps, forced air convection, or the like at block 530. In one embodiment, liners 104 are heated to a temperature ranging from about 110° F. to about 160° F. In another embodiment, liners 104 are heated to a temperature ranging from about 120° F. to about 140° F. Heating liners 104 reduces slippage and de-lamination between liners 104 and surround 102, warping of liners 104 and surround 102, and the like as the surround material solidifies and liners 104 and surround 102 cool. This helps to maintain pressure-sealing contact between perimeter 300 and surround 102.

Liners 104 are placed in the mold at block 540. This includes abutting surfaces 114 of each protrusion 108 of each liner 104 and interior surfaces of the mold to prevent surfaces 114 from being covered by shell material during molding so that surfaces 114 are substantially flush with surface 116 of surround 102 after molding. Molten surround material is injected into the mold at block 550. The molten surround material flows within channels 214 and through apertures 212 of liners 104. In one embodiment, the mold substantially fills interior 106 of each of liners 104, preventing the molten surround material from flowing into interior 106. When the molten surround material solidifies, solidified surround material fills channels 214, and ribs of solidified surround material extend from surround 102 through apertures 212. This reduces slippage and de-lamination between liners 104 and surround 102. The surround material filling the channels 214 of the interior surfaces of liners 104 and the ribs extending through apertures 212 are substantially flush with the interior surfaces of liner 104.

The surround material is allowed to cure, e.g., from about three to four minutes, at block 560. In one embodiment, the temperature of interior surfaces of the mold cavity is set and maintained at a value so that the surround material has a resin-rich surface to produce a relatively smooth, hard surface on surround 102. In one embodiment, this temperature is within a range from about 170° F. to about 180° F.

Composite shell 100 is removed from the mold at block 570. In one embodiment, angle 310, shown in FIG. 3 and described above, reduces the likelihood of galling surface 114 of protrusion 108 during removal of composite shell 100 from the mold.

Composite shell 100 is allowed to stabilize at block 580. In one embodiment shell 100 is stabilized when dimensions of shell 100 stop changing due to shrinkage and creep as surround 102 cools and solidifies and liners 104 cool. In one embodiment, this takes at least 48 hours. In another embodiment, measurements of the dimensions are performed at a succession of times after removing composite shell from the mold to determine when the dimensions stop changing. In some embodiments, stabilization involves placing composite shell 100 in a substantially constant temperature environment at a temperature within a range from about 65° F. to about 85° F.

CONCLUSION

Embodiments of the present invention have been described. The embodiments provide methods for molding a surround over a liner to form a composite shell. The liner is placed in a mold and molten surround material is injected into the mold so as to surround the liner. A surface of a protrusion of the liner abuts the mold so that the surface is exposed and is substantially flush with an exterior surface of the surround after the composite shell is removed from the mold. Molten surround material flows into a slot in a perimeter of the protrusion so that when the surround material solidifies, a rib of surround material extends into the slot to form a pressure seal between the liner and the surround. An adhesive is applied to the liner before placing the liner in the mold for reducing relative movement between the liner and surround as the surround material solidifies and the liner and surround cool, thereby helping to maintain pressure-sealing contact between the perimeter and the surround. In another embodiment, the molten surround material flows into a plurality of channels disposed in an exterior surface of the liner to reduce slippage and de-lamination between the metal liner and the surround when the surround material solidifies, helping further to maintain pressure-sealing contact between the perimeter and the surround.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, liners 104 are not limited to having apertures 212 passing through them and channels 214 disposed on their interior and exterior surfaces. Instead, in one embodiment; channels, e.g., of dovetail cross-section or the like, may be disposed only on the exterior surfaces on liners 104 for reducing slippage and de-lamination between liners 104 and surround 102. The adhesive will be applied to bounding surfaces of these channels prior to molding, and they will be substantially filled with surround material during molding. Moreover, composite shell 100 is not limited to two liners 104. Instead, composite shell can 100 can have a single liner 104 or three or more liners 104. It is manifestly intended that this invention be limited only by the following claims and equivalents thereof.

What is claimed is:

1. A method for molding a composite object, the method comprising:

applying an adhesive to a first object of a first material;

curing the adhesive;

heating the first object with the cured adhesive thereon;

placing the heated first object in a mold so that a surface of a protrusion of the first object abuts an interior surface of the mold to prevent the surface of the protrusion from being covered by a second material to be injected into the mold in a molten state;

injecting the second material in the molten state into the mold so that the second material surrounds the first object to form the composite object, the second material flowing into a continuous slot around a perimeter of the protrusion of the first object so that when the second material solidifies, a rib of the second material extends into the continuous slot around the perimeter to form a pressure seal between the first object and the second material;

removing the composite object from the mold, wherein the protrusion of the first object extends through the second material so that the surface of the protrusion is substantially flush with an exterior surface of the second material; and stabilizing the composite object until dimensions of the composite object stop changing.

2. The method of claim 1, wherein applying an adhesive to a first object comprises applying the adhesive to a heat conducting object.

3. The method of claim 1, wherein applying an adhesive to a first object comprises applying the adhesive to a metal object.

4. method of claim 3, wherein applying the adhesive to a metal object comprises applying the adhesive to an aluminum object.

5. The method of claim 1, wherein injecting the second material in the molten state into the mold comprises injecting a substantially non-heat conducting material in the molten state into the mold.

6. The method of claim 1, wherein injecting the second material in the molten state into the mold comprises injecting a plastic in the molten state into the mold.

7. The method of claim 1, wherein injecting the second material in the molten state into the mold comprises injecting glass-filled nylon in the molten state into the mold.

8. The method of claim 1, further comprising curing the second material after injecting the second material into the mold.

9. The method of claim 1, wherein curing the adhesive comprises curing the adhesive from about 6 hours to about 48 hours.

10. The method of claim 7, wherein heating the first object comprises heating the first object to a temperature ranging from about 110° F. to about 160° F.

11. The method of claim 7, wherein heating the first object comprises heating the first object to a temperature ranging from about 120° F. to about 140° F.

12. The method of claim 1, wherein stabilizing the composite object comprises placing the composite object in a substantially constant temperature environment.

13. The method of claim 7, wherein stabilizing the composite object comprises placing the composite object in a substantially constant temperature environment having a temperature ranging from about 65° F. to about 85° F.

14. The method of claim 1, wherein placing the first object in a mold comprises placing the first object in a mold having an internal surface temperature so that the second material has a resin-rich surface, whereby producing a relatively smooth, hard surface on the second material.

15. The method of claim 7, wherein placing the first object in a mold comprises placing the first object in a mold having an internal surface temperature within a range from about 170° F. to about 180° F.

16. The method of claim 1, wherein stabilizing the composite object comprises measuring the dimensions at a succession of times after removing the composite object from the mold.

17. The method of claim 1, wherein injecting the second material in the molten state into the mold comprises the second material flowing into a plurality of channels disposed in an exterior surface of the first object.

18. The method of claim 1, wherein injecting the second material in the molten state into the mold comprises the second material flowing into rectangular and semi-circular slots in the perimeter of the protrusion of the first object.

19. A method for molding a composite shell, the method comprising:

applying an adhesive to surfaces of a metal liner to be covered by a surround of the composite shell;

heating the metal liner with the adhesive thereon;

placing the heated metal liner in a mold so that a surface of a protrusion of the metal liner abuts an interior surface of the mold so that the surface of the protrusion remains uncovered by the surround;

injecting a plastic in a molten state into the mold so that the plastic surrounds the metal liner to form the surround and thereby the composite shell, the plastic flowing into a plurality of channels disposed in an exterior surface of the metal liner to reduce slippage and delamination between the metal liner and the surround when the plastic solidifies, the plastic flowing into a plurality of continuous slots around a perimeter of the protrusion so that when the plastic solidifies, a plurality of plastic ribs extend into the plurality of continuous slots around the perimeter to form a pressure seal between the metal liner and the surround;

removing the composite shell from the mold, wherein the protrusion of the liner extends through the surround so that the surface of the protrusion is substantially flush with an exterior surface of the surround; and stabilizing the composite shell until dimensions of the composite shell stop changing.

20. The method of claim 19, further comprising curing the adhesive after applying the adhesive.

21. The method of claim 19, further comprising curing the plastic after injecting the plastic into the mold.

22. The method of claim 19, wherein stabilizing the composite shell comprises measuring the dimensions at a succession of times after removing the composite shell from the mold.

23. The method of claim 19, wherein injecting the plastic in the molten state into the mold comprises the plastic flowing into a plurality of continuous rectangular and semi-circular slots around the perimeter of the protrusion of the metal liner.

24. A method for molding a composite shell, the method comprising:

applying an adhesive to surfaces of a pair of aluminum liners to be covered by a surround of the composite shell;

heating the pair of aluminum liners with the adhesive thereon;

placing the heated pair of aluminum liners in a mold so that a surface of a protrusion of each of the pair of aluminum liners abuts an interior surface of the mold so that the surface of the protrusion remains uncovered by the surround;

injecting glass-filled nylon in a molten state into the mold so that the glass-filled nylon material surrounds the pair of aluminum liners to form the surround and thereby the composite shell, the glass-filled nylon flowing into a plurality of channels disposed in an exterior surface of each of the aluminum liners to reduce slippage and de-lamination between the aluminum liners and the surround when the glass-filled nylon solidifies, the glass-filled nylon flowing into a plurality of continuous slots around a perimeter of the protrusion so that when the glass-filled nylon solidifies, a plurality of glass-filled nylon ribs extend into the plurality of continuous slots around the perimeter to form a pressure seal between the metal liner and the surround;

removing the composite shell from the mold, wherein the protrusion of each of the pair of aluminum liners extends through the surround so that the surface of the protrusion is substantially flush with an exterior surface of the surround; and stabilizing the composite shell until dimensions of the composite shell stop changing.

25. The method of claim 24, further comprising curing the glass-filled nylon from about three to four minutes after injecting the glass-filled nylon into the mold.

26. The method of claim 24, wherein curing the adhesive comprises curing the adhesive from about 6 hours to about 48 hours.

27. The method of claim 24, wherein heating the pair of aluminum liners comprises heating the pair of aluminum liners to a temperature ranging from about 110° F. to about 160° F.

28. The method of claim 24, wherein heating the pair of aluminum liners comprises heating the pair of aluminum liners to a temperature ranging from about 120° F. to about 140° F.

29. The method of claim 24, wherein stabilizing the composite shell comprises placing the composite shell in a substantially constant temperature environment having a temperature ranging from about 65° F. to about 85° F.

30. The method of claim 24, wherein stabilizing the composite takes at least 48 hours.

31. The method of claim 24, wherein placing the pair of aluminum liners in a mold comprises placing the pair of aluminum liners in a mold having an internal surface temperature within a range from about 170° F. to about 180° F.

32. The method of claim 24, wherein stabilizing the composite shell comprises measuring the dimensions at a succession of times after removing the composite shell from the mold.

33. A method for molding a composite shell, the method comprising:
applying an adhesive to surfaces of a metal liner to be covered by a surround of the composite shell;
heating the metal liner with the cured adhesive thereon;
placing the heated metal liner in a mold so that a surface of a protrusion of the metal liner abuts an interior surface of the mold so that the surface of the protrusion remains uncovered by the surround;
injecting a plastic in a molten state into the mold so that the plastic surrounds the metal liner to form the surround and thereby the composite shell, the plastic flowing into a plurality of channels disposed in an exterior surface of the metal liner to reduce slippage and de-lamination between the metal liner and the surround when the plastic solidifies, the plastic flowing into a plurality of continuous slots around a perimeter of the protrusion so that when the plastic solidifies, a plurality of plastic ribs extend into the plurality of continuous slots around the perimeter to form a pressure seal between the metal liner and the surround;
wherein heating the metal liner comprises heating the metal liner independent of injecting the plastic in a molten state into the mold so that the plastic surrounds the metal liner; and
stabilizing the composite shell until dimensions of the composite shell stop changing.

34. The method of claim 33, further comprising curing the adhesive after applying the adhesive.

35. The method of claim 33, further comprising curing the plastic after injecting the plastic into the mold.

36. The method of claim 33, wherein stabilizing the composite shell comprises measuring the dimensions at a succession of times after removing the composite shell from the mold.

37. The method of claim 33, wherein injecting the plastic in the molten state into the mold comprises the plastic flowing into a plurality of rectangular and semi-circular slots in the perimeter of the protrusion of the metal liner.

38. The method of claim 33, further comprising removing the composite shell from the mold, wherein the protrusion of the liner extends through the surround so that the surface of the protrusion is substantially flush with an exterior surface of the surround.

39. The method of claim 33, wherein the pressure seal formed between the metal liner and the surround is sealed against a pressure differential of about 15 psi.

* * * * *